March 22, 1960 — P. A. LUTHMAN ET AL — 2,929,313
FEED MECHANISM FOR BALERS
Filed Jan. 28, 1957 — 7 Sheets-Sheet 1

INVENTORS.
PAUL A. LUTHMAN.
JAMES R. STARRETT.
ATTORNEYS.

March 22, 1960 P. A. LUTHMAN ET AL 2,929,313
FEED MECHANISM FOR BALERS
Filed Jan. 28, 1957 7 Sheets-Sheet 2

INVENTORS.
PAUL A. LUTHMAN.
BY JAMES R. STARRETT.
ATTORNEYS.

March 22, 1960

P. A. LUTHMAN ET AL 2,929,313

FEED MECHANISM FOR BALERS

Filed Jan. 28, 1957

INVENTOR.
PAUL A. LUTHMAN.
JAMES R. STARRETT.
BY
ATTORNEYS.

March 22, 1960 P. A. LUTHMAN ET AL 2,929,313
FEED MECHANISM FOR BALERS
Filed Jan. 28, 1957 7 Sheets-Sheet 4

INVENTOR.
PAUL A. LUTHMAN.
JAMES R. STARRETT.
BY
ATTORNEYS.

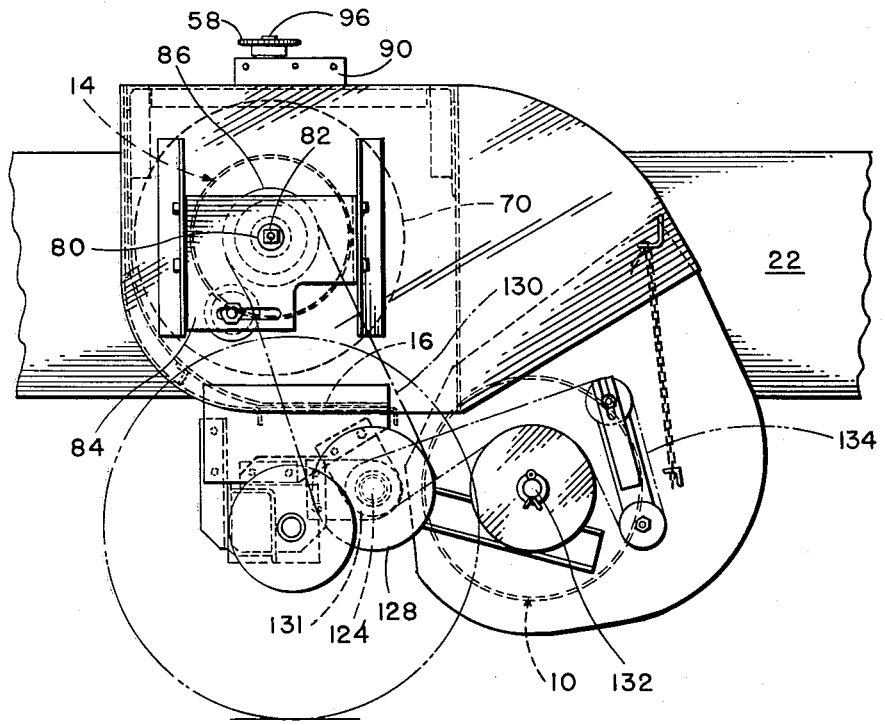

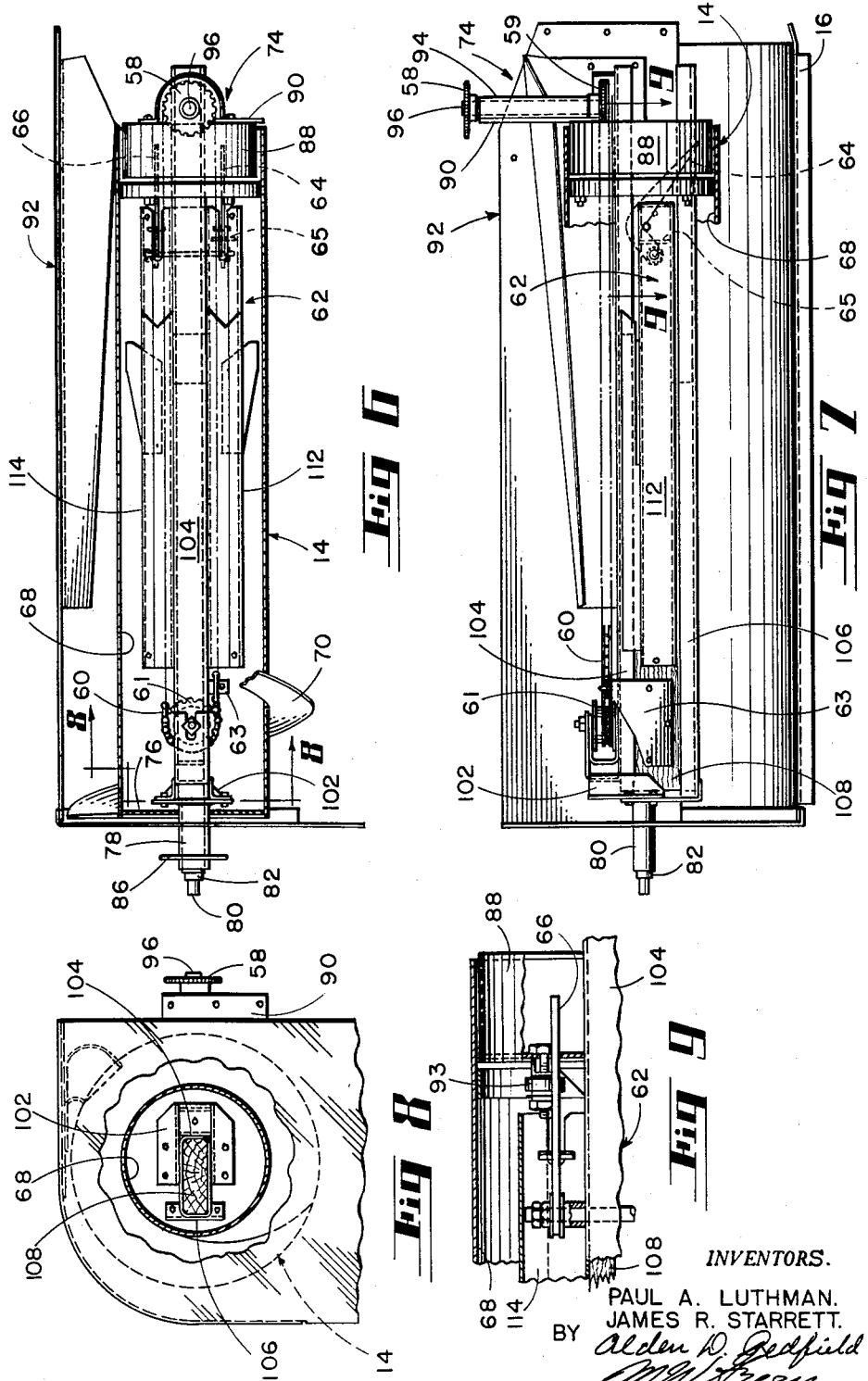

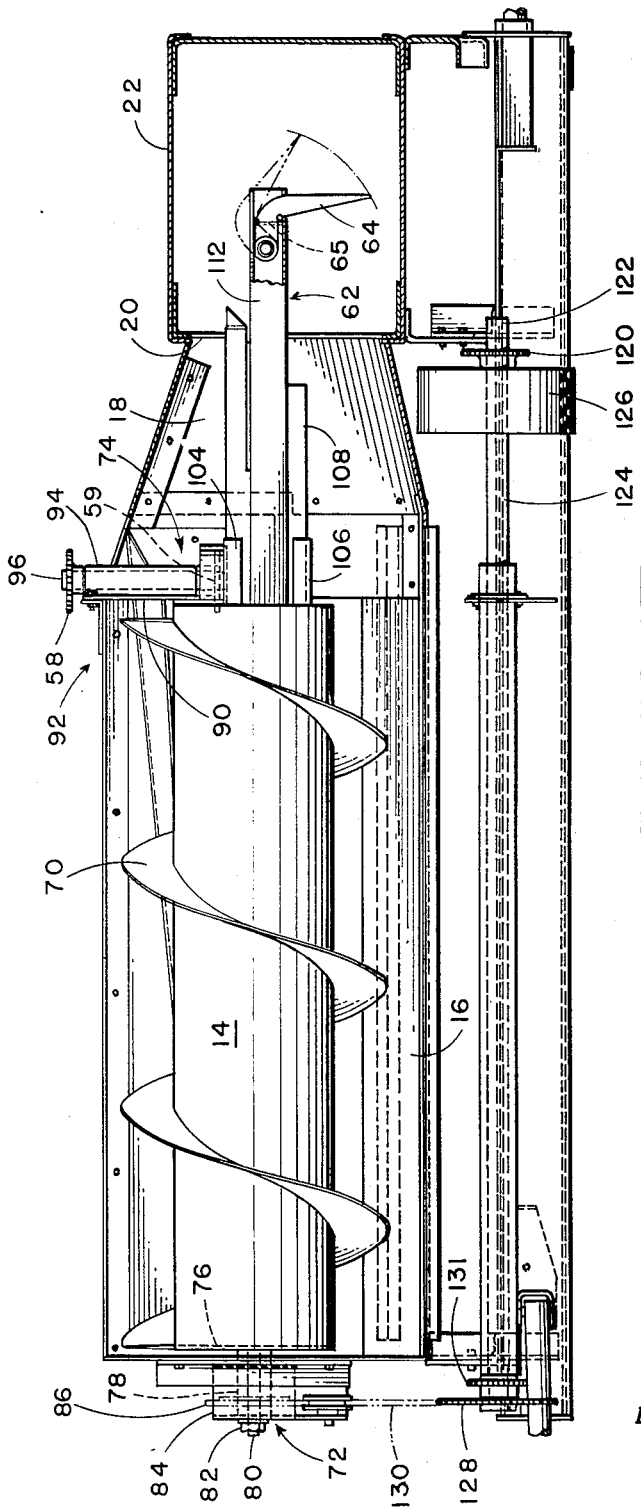

United States Patent Office 2,929,313
Patented Mar. 22, 1960

2,929,313

FEED MECHANISM FOR BALERS

Paul A. Luthman, Maria Stein, and James R. Starrett, Springfield, Ohio, assignors to Avco Manufacturing Corporation, Cincinnati, Ohio, a corporation of Delaware Application January 28, 1957, Serial No. 636,530

7 Claims. (Cl. 100—142)

The present invention relates to hay balers, and is more specifically directed to an improved mechanism for effectively carrying material to be baled into the bale chamber ahead of the bale plunger. The structure disclosed is particularly applicable to so-called field pickup balers designed to be drawn behind a tractor over a field to pick up hay or other crop material and to bale it immediately after pickup, the completed bales being either dropped on the ground behind the baler or loaded upon a wagon hitched behind the baler.

In the structure of field pickup balers there is a material advantage in compactness of mechanism. The requirement to pick up crop material from the ground necessitates a movement of this material, after pickup, in a transverse direction toward an adjacent bale chamber and subsequently to push the material into the bale chamber in intermittent feeding movements in timed relation to the reciprocating bale plunger.

In certain prior art devices transverse material moving mechanisms have been employed which move the material to be baled to the top of the bale case, where a reciprocating plunger is provided operating in a vertical reciprocating movement. Still later devices employed transverse material moving mechanisms such as a feed auger with adjacent and parallel reciprocating feed rams or fork mechanisms.

It is a primary object of the present invention to combine the transverse material moving element with a feed ram in a closely associated relationship, resulting in a compactness of arrangement and efficiency of operation in the transverse movement of the material and the feeding thereof into the side of the bale case ahead of the bale plunger.

It is a further object of the invention to provide a transverse material moving element in the form of a rotating feed auger having a hollow center and providing in this hollow center a reciprocating feed ram which in its reciprocating movement projects from the feed discharge end of the feed auger and thereby makes it possible to move material to be baled directly from the end of the feed auger into the bale case.

It is a further object to provide a release mechanism in the drive connection for the feed ram, whereby the drive for reciprocation of the feed ram is released on overload during the feeding stroke of said ram, but the reciprocating mechanism for the ram is always effective to remove the feed ram from the bale case on the opposite stroke of the reciprocating movement, thereby to avoid interference between the feed ram and the bale plunger.

Figure 5 is an end view of the pickup and feed mechanism at the outboard end of the baler pickup and feed deck.

Figure 6 is a top view and section through the feed auger showing the reciprocating feed ram.

Figure 7 is a front view and section of the mechanism shown in Figure 6.

Figure 8 is an end section on line 8—8 of the mechanism shown in Figure 6.

Figure 9 is a section on line 9—9 of Figure 7.

Figure 10 is a front view partially in section showing the auger and feed ram together with drive mechanism for the auger and ground pickup.

Figure 1:
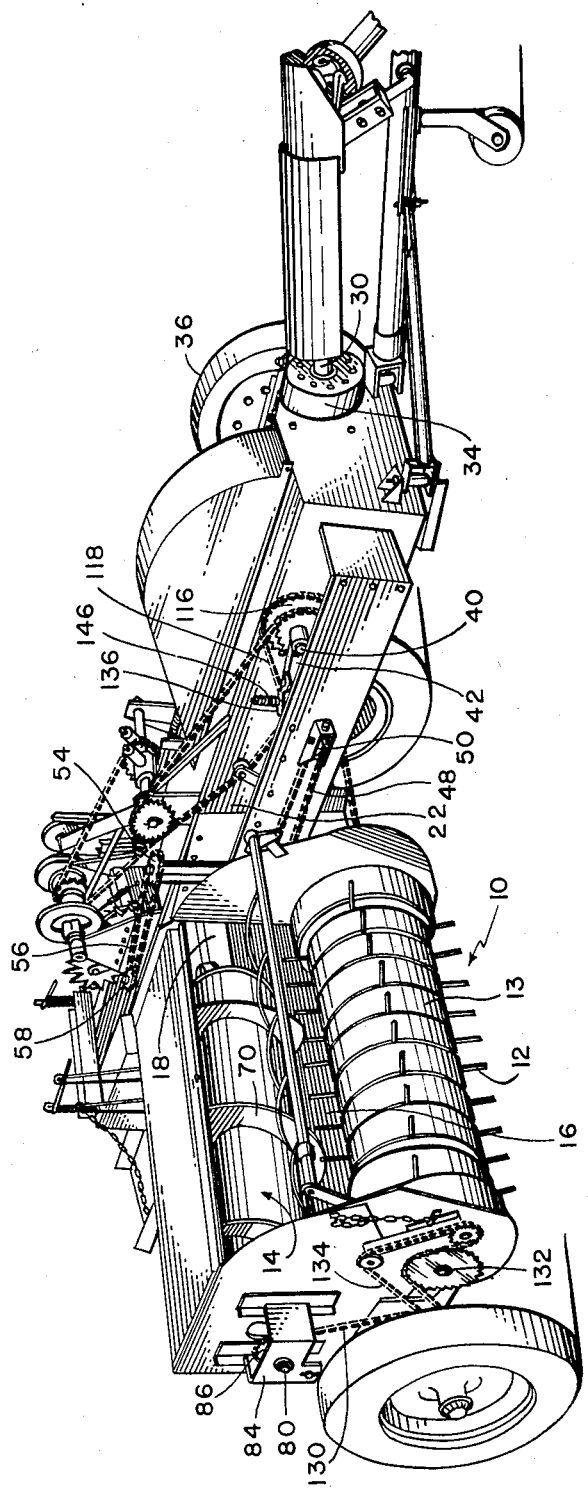
Figure 1 is a perspective view of a complete baler of the type employing the feed mechanism of the present invention.
Figure 2:
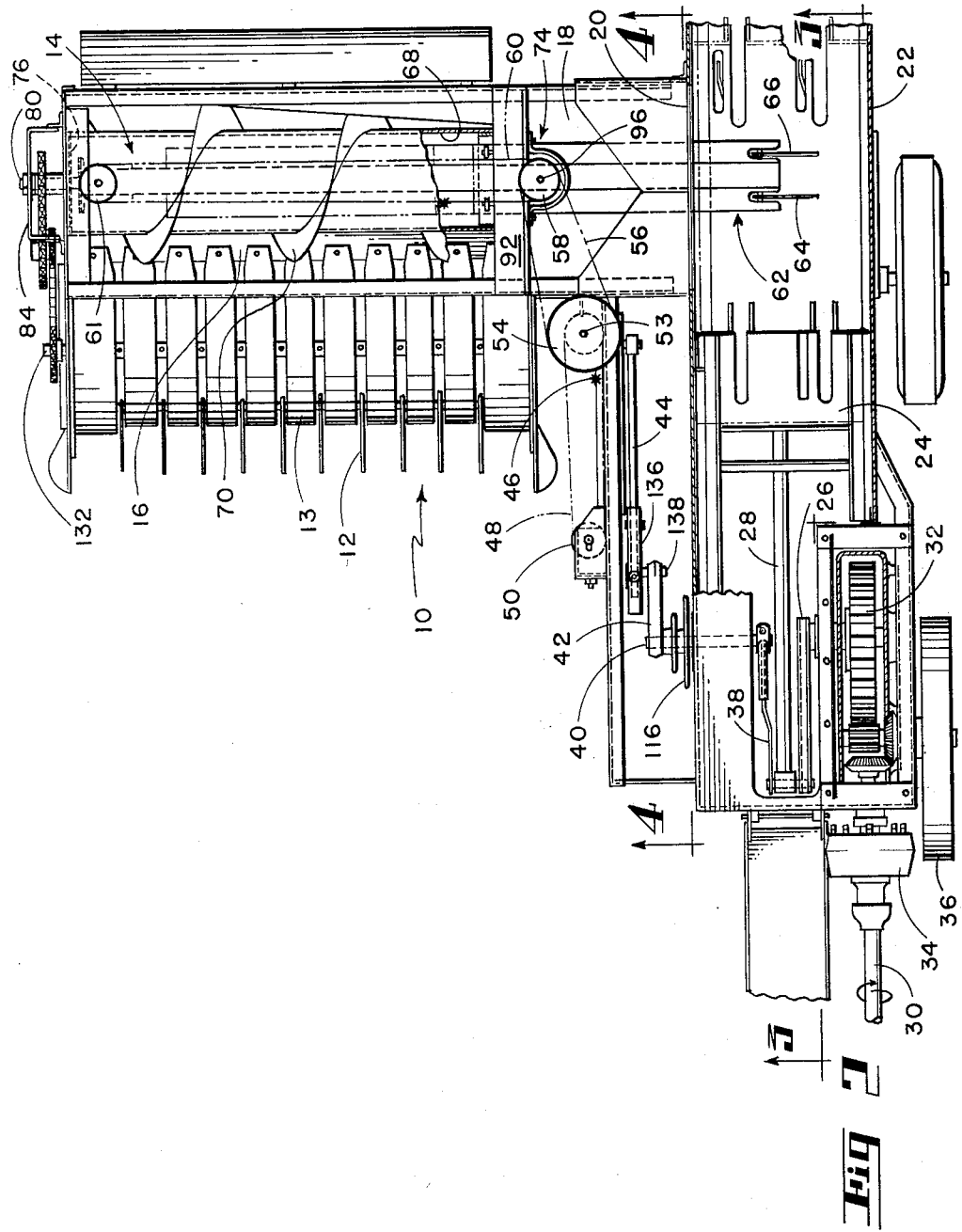
Figure 2 is a top view of the baler, including the feed mechanism and the bale case and plunger, together with the ground pickup mechanism.
Figure 3:
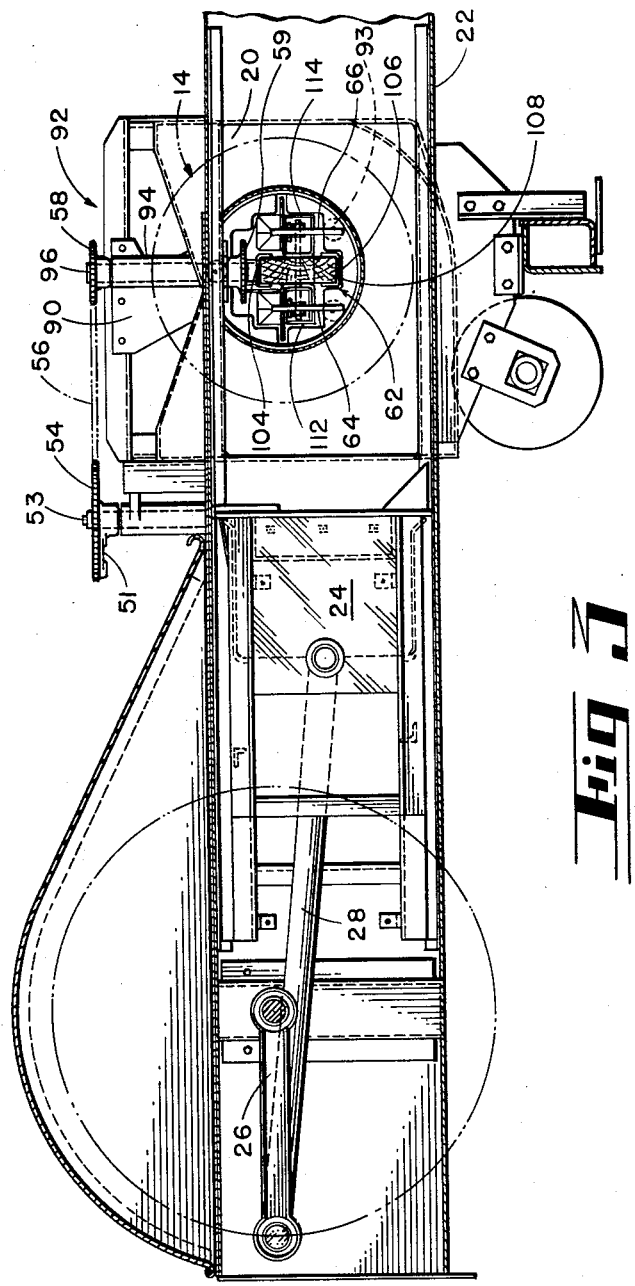
Figure 3 is a section taken on line 3—3 of Figure 2.

Referring to the drawings, and particularly to Figures 1 and 2, there is shown a baler of the so-called field pickup type designed to operate as an automatic unit when pulled behind a tractor to satisfactorily complete the baling of crop material, such as hay, when drawn over a field where windrows of hay are raked together and cured ready for pickup and baling.

The baler comprises a pickup unit 10 with cam controlled ground engaging fingers 12, operating between guards 13, which fingers pick up material from the ground and deliver it rearwardly as shown in Figure 2 onto a deck 16 against a rotating feed auger 14 mounted to feed material sidewise along the deck 16 into a feed channel 18 adjacent an opening 20 in the side of a bale case 22, in which there is a plunger 24 reciprocated in the bale case by a crank 26 and connecting rod 28. A source of power, which may be a tractor not shown, rotates a power takeoff shaft 30 driving a gear train 32 which rotates the crank 26 at a speed of rotation substantially less than the speed of rotation of the power shaft 30, with an appropriate mechanical advantage afforded by the series of gears in the gear train 32. The drive is through a clutch 34 and a flywheel 36 to afford momentum.

The crank 26 which reciprocates the connecting rod 28 and plunger 24 is connected by a crank arm 38 to rotate a shaft 40 which actuates a crank 42, which crank is connected to a pitman 44 to reciprocate a chain connector 46 (Figure 2) which causes a chain 48 to reciprocate in its movement around sprockets 50 and 52, which also reciprocates sprocket 54 through shaft 53 and thereby reciprocates chain 56 to create like movement in sprockets 58 and 59 and chain 60 which is mounted inside the auger 14 on sprockets 59 and 61.

There is also mounted inside the auger 14, on a suitable mounting later described, a feed ram 62 which is connected by bracket 63 (see Figures 6 and 7) to be reciprocated by the movement of chain 60 and reciprocates from a position inside the auger 14 (Figure 6) to a position projecting into the side opening 20 of the bale case 22 as shown in the drawing of Figures 2 and 10.

There has been described, and there is shown generally in Figures 2 and 10, the feed ram 62 reciprocated partially inside the feed auger 14 and which extends in its reciprocating travel outwardly from the inner end of the auger 14 to reciprocate into and out of the side of the bale case 22 through the feed channel 18 so that hay or other material to be baled which is picked up by the pickup mechanism 10 and which is deposited on the deck 16 adjacent the auger will be fed along the outside of the auger and discharged from the end of the auger into the channel 18 and, by reciprocating movement of the feed ram 62, will be moved by such reciprocation from the discharge end of the auger through the channel 18 into the side opening 20 of the bale case 22.

The end of the feed ram 62 has fingers 64 and 66 which are pivoted so that on movement of the feed ram into the bale case the fingers extend downwardly at a right angle position against a stop 65 to push the hay and on retraction of the feed ram the fingers 64 and 66 deflect to a horizontal position to move without pushing movement on the adjacent hay.

The feed auger 14 is made up of a hollow cylinder 68 with a spiral fin 70 welded to the outside thereof. The entire feed auger assembly 14 is mounted for rotation above the deck 16 to the rear of the pickup unit 10 on an outer support 72 and an inner support 74. The outer end of the feed auger cylinder 68 is closed by a plate 76 (Figure 6) forming an outer end for the cylinder, and to the center of this plate there is welded a tube 78, and shaft 80 carried inside this tube projects outwardly from the end of the tube in a square end 82. The square end 82 of this shaft 80 is supported in a bracket 84, so that the outer end of the feed auger cylinder is free to rotate on the shaft. The outside of the tube 78 is provided with a sprocket 86 (Figures 5 and 6) which drives the auger in rotation in a manner later to be described.

The inner support 74 for the cylinder 68 of the auger 14 is provided by a short cylindrical section 88, which is of a size such that it fits inside the hollow cylinder 68 of the feed auger 14, the cylindrical section 88 being supported at its end by a bracket 90 which is formed to extend upwardly to connect to frame member 92 (Figures 7 and 10). The inside end of the cylinder section 88 is provided with a plurality of rollers 93 (Figure 9) which contact the inside of the hollow cylinder 68 to provide for satisfactory rotating movement of the cylindrical feed auger 14. The inner end of the feed auger 14 thus is rotatably supported at both its inner and outer ends for rotation as previously mentioned.

A general description of the feed ram 62 reciprocating inside the feed auger 14 has been stated above, but there is added here a more detailed description of the mounting and parts of the feed ram. It has been stated that the previously mentioned sprocket 58 is oscillated by the reciprocating motion of the chain 56 and by reference to Figure 7 there is shown a tubular support 94 which is also secured to the bracket 90, and tubular support 94 carries the shaft 96 extending downwardly so that this shaft at its upper end is secured to the sprocket 58 and at its lower end to sprocket 59. Sprocket 59 carries the previously mentioned chain 60 which extends inside the feed auger 14 and operates around a sprocket 61, also inside the feed auger at the outer end thereof (Figures 2, 5, 6, 7). This sprocket 61 is supported on the bracket 102, which is formed and secured to the shaft 80 (Figure 7).

Also secured to the shaft 80 through the bracket 102 there are a pair of channels 104 and 106 which serve as support rails for the feed ram and extend from the bracket 102 through the central portion of the feed auger cylinder 68 and are supported from the previously mentioned bracket 90 and are also secured to the short cylindrical section 88 at the inner end of the feed auger. The two channels 104 and 106 face each other and carry a wood body section 108 (Figure 8), making up a major reciprocating portion of the feed ram 62. This body section 108 is secured to the reciprocating chain 60 by bracket 63, so that the body section 108 reciprocates in the channels 104 and 106 on reciprocating movement of the chain 60. The body section 108 has channels 112 and 114 secured on each side thereof defining a width of the feed ram 62, and at the outer end of these channels there are supported the previously mentioned fingers 64 and 66.

The feed ram 62, by the mechanism described above, will therefore be reciprocated out from the inner end of the feed auger through the feed channel 18 and into the bale case 22, the maximum outward stroke of this reciprocation being shown in Figures 2 and 10 and the inward travel of the reciprocation being shown in Figure 6. This reciprocation is of course determined by the reciprocating movement of the chain 60 through the series of chains and sprockets previously mentioned. Chain 60 is secured to feed ram 62 by bracket 63 (Figure 6).

It has been previously mentioned in the description of Figure 2 that shaft 40 is rotated by the crank arm 38 to produce reciprocating motion of the feed ram. This shaft 40 has a sprocket 116 provided at its inner end which drives a chain 118 (see Figure 4) downwardly to a sprocket 120 to rotate coaxial shafts 122 and 124 which extend under the deck 16 of the baler to the outer end of the deck 16 (see Figure 10). The shafts 122 and 124 are connected by a slip-clutch 126 for overload release. The shaft 124 (see Figure 5) extends to the outside end of the deck 16, as shown in Figures 5 and 10, and drives the sprocket 128 with chain 130 (Figure 5), which drives the previously mentioned sprocket 86 and which rotates the feed auger 14. Another chain 134 driven from a sprocket 131, also secured to the shaft 124, drives the pickup mechanism shaft 132 through the chain 134. The drive for the pickup mechanism 10 and the spiral feed auger 14 is thereby afforded from the outer end of the pickup unit and the feed deck, with suitable overload release afforded by the slip-clutch 126.

The mechanism for reciprocating the feed ram 62 out from the end of the auger 14 into and out of the bale case 22 by a series of chains, sprockets, and shafts, set in reciprocating motion by a crank and pitman 42—44, has been previously described. It will be observed on inspection of the drawings, that the assembly of parts is such that the reciprocating movement of the feed ram 62 is so timed in relation to the reciprocating movement of the bale plunger 24 that maximum projection of the feed ram into the bale case occurs when the plunger is positioned back from the opening 20 (that is, when the plunger is substantially in the position in which it is shown in Figure 2), so that the maximum retracted movement of the bale plunger corresponds substantially to the maximum outward projecting movement of the feed ram 62. In other words, the relative reciprocating movement of the feed ram 62 and bale plunger 24 are of opposite phase so that the hay or other material to be baled is pushed into the side opening 20 of the bale case when the plunger is retracted, and, as the plunger 24 moves in the baling stroke, the feed ram 62 is then retracted and the plunger 24 carries the hay or other material, which has been pushed into the side of the bale case, rearwardly to be baled.

However, in order to provide for exceptional circumstances when there is a very substantial obstruction to the outward movement of the feed ram 62, such as a very heavy load of packed hay or other obstruction, a release mechanism is provided in the linkage which operates only on the outward stroke of the feed ram 62 while always retaining a positive connection to pull the feed ram in its retraction stroke out of the bale case out of interference with the plunger 24. This mechanism, as shown, is made up of a sliding sleeve 136 (see Figures 2 and 4) which is mounted to slide on the pitman 44 and carries a shaft 138 which forms a connection with the crank arm 42. The sliding sleeve 136 is retained against an outward sliding movement on the pitman (toward left in Figure 4) by contact with a stop member 140 which limits its outward sliding movement along the pitman, but sleeve 136 is retained from sliding movement in the opposite direction (toward right in Figure 4) by a pair of pivoted grooved arms 142—144 which are held against the ends of the stop member 140 by springs 146—148.

Figure 4:
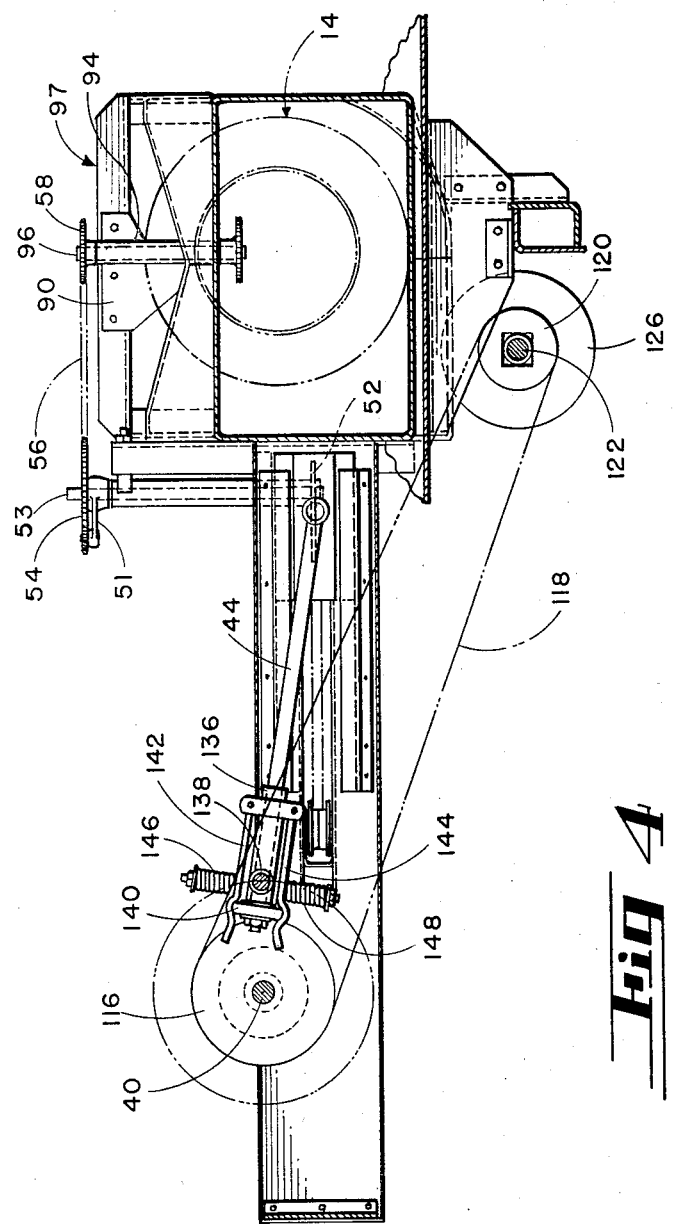
Figure 4 is a section taken on the line 4—4 of Figure 2.

Therefore, when the crank arm 42 driven by shaft 40 reciprocates the pitman 44 through the retained sleeve 136 mounted as above described, the movement of the sleeve 136 relative to the pitman 44 in the left to right direction, as viewed in Figure 4, will be subject to a release by an overload, if the load exceeds that which is held by the arms 142—144 retained by springs 146—148. When such release occurs, the direction of movement of the feed ram 62 generated through the chain and sprocket linkage previously described will, on compression stroke of the pitman 44, be in a direction such that the movement of the feed ram 62 will be toward and into the bale case 22; that is, on the feeding stroke of the feed ram 62 this release can occur if there is a sufficient overload caused by obstruction. However, in the case of opposite movement of the crank arm relative to the pitman 44, that is, a tensioning of the pitman 44, the sliding member 136 will move outward against the stop 140 and therefore will always give full stroke to pull the feed ram 62 in its retracting stroke. In other words, there is no overload release on the retraction stroke of the feed ram 62, and it is therefore always moved out of the way of the advancing plunger 24. Although it may have been released by an overload on its previous outward stroke, the feed ram 62 is nevertheless pulled out of the way on the return stroke and might again release on the opposite inward stroke towards the bale case if the obstruction still continued and was not removed by the intervening stroke of the bale plunger 24.

The plunger 24 is thus given an opportunity between each reciprocation of feed ram 62 to remove the obstruction which may have caused the overload release of the feed ram. If the obstruction is of such nature as to be incapable of being overcome by the plunger movement, the clutch 34 of the power take-off shaft is available to slip for such an overload. However, such slippage will not interfere with the timing between plunger mechanism and the feed ram.

In order to provide a manual adjustment of the penetration of the ram into the bale case, an adjustment arm 51 is provided which enables the sprocket 54 to be released from the shaft 53 and manually adjusted to other angular positions relative thereto when desired. Such adjustment includes a plurality of angularly spaced apertures on sprocket 54 in which arm 51 carried by shaft 53 may be selectively secured for adjustment.

The operation of the baler is generally evident from the above description of the mechanism, but a concise statement of operation is again stated below and will serve to emphasize certain important features:

A baler pulled behind a tractor and operated through take-off shaft 30 picks up material to be baled from the ground by operation of pickup mechanism 10. This material to be baled, being deposited on the deck 16 by the pickup mechanism, is acted upon by the spiral fin 70 of the feed auger 14 to be moved transversely along the deck 16 toward the end of the auger 14 and into the channel 18 adjacent the bale case 22. The previously mentioned timed reciprocation of the feed ram 62 causes the feed ram to intermittently project out from the end of the feed auger 14 through the channel 18 and into the bale case 22 through the side opening 20, the feed ram carrying with it the hay or other material which is fed out the end of the auger 14. This movement of the feed ram 62 into the bale case 22 occurs when the bale plunger 24 is in its retracted portion of its stroke, and the subsequent movement of the bale plunger rearward is accompanied by the retraction of the feed ram 62 and the hay or other material thus pushed into the bale case is compressed by the plunger. In case of an obstruction occurring which is of sufficient magnitude to cause the release of the sliding connection 136 during the outward stroke of the feed ram into the bale case, the feed ram will stop in its travel on encountering such obstruction, but, on the return stroke of the pitman 44 and the return stroke of the crank arm 42, the pitman 44 will be again picked up by the sliding connection 136 and the feed ram 62 retracted. This attempt to push the hay or other material into the bale case will be repeated, and if on the next stroke it is possible to push the hay into the bale case before the pressure is sufficient to release the connection, the stroke will be completed. This might occur when the obstruction is cleared by the intervening stroke of the bale plunger 24.

Although the invention has been described by specific structure found practical in operation, it is contemplated that various changes and modifications may be made within the scope of the following claims:

1. In a baler and feed mechanism therefor of the character described, a bale chamber, a side of said bale chamber having an opening therein for feeding material to be baled, a rotatable hollow feed auger positioned to lone side of the bale chamber and positioned with its axis of rotation transverse to the bale chamber and having a feed discharge end thereof in substantial alignment with the said opening in the side of said bale chamber, a feed ram mounted to reciprocate substantially on the rotational axis of said auger and partially inside said auger and to project in its path of reciprocation from the said feed discharge end of said auger into said bale chamber, thereby to feed material to be baled from the end of said auger into said bale chamber.

2. In a baler and feed mechanism therefor of the character described, a bale chamber, a plunger mounted for reciprocation therein, a side of said bale chamber having an opening therein for feeding material to be baled, a rotatable hollow feed auger positioned to one side of the bale case and positioned with its axis of rotation transverse to the bale chamber and having a feed discharge end thereof in substantial alignment with the said opening in the side of the bale case, a feed ram mounted to reciprocate substantially on the rotational axis of said auger and partially inside said auger and to project in its path of reciprocation from the said feed discharge end of said auger into said bale chamber, and drive transmitting connections between said plunger and feed ram to maintain reciprocating movement of said feed ram in timed opposite phase relation to the reciprocation of said plunger, thereby to feed material discharged from the end of said auger into said bale chamber ahead of said plunger.

3. In a baler and feed mechanism therefor as in claim 2, in which said drive transmitting connections are chains and sprockets.

4. A mechanism as in claim 2, in which the drive transmitting connections include a crank and pitman and an overload release operable only on the direction of reciprocating movement of the feed ram which moves said feed ram for feeding movement.

5. A mechanism as in claim 2, in which the drive transmitting connections include a crank and pitman and an overload release operable only on the direction of reciprocating movement of the feed ram which moves said feed ram for feeding movement, said release being ineffective on the opposite direction of movement, whereby said feed ram is always removed from the path of said bale plunger.

6. A mechanism as in claim 2, in which the drive transmitting connections comprise a linkage actuated from a member which also actuates the bale plunger.

7. In a baler and feed mechanism therefor of the character described, a bale chamber, a side of said bale chamber having an opening therein for feeding material to be baled, a feed channel adjacent the opening in the side of said bale chamber, a rotatable hollow feed auger positioned to one side of the bale chamber and positioned with its axis of rotation transverse to the bale chamber and having a feed discharge end thereof in substantial alignment with said opening in the side of said bale chamber and the said feed discharge end adapted to feed material into said channel, a feed ram mounted to reciprocate inside said auger and to project in its reciprocation from said feed discharge end of said auger into said feed channel and into said bale chamber through said side opening, whereby material fed from the end of said auger into said feed channel is pushed by said feed ram through said channel into said bale chamber.

References Cited in the file of this patent

UNITED STATES PATENTS

| | | |
|---|---|---|
| 1,072,069 | Wygant | Sept. 2, 1913 |
| 2,030,031 | Innes | Feb. 4, 1936 |
| 2,450,082 | Crumb et al. | Sept. 28, 1948 |
| 2,487,938 | Nikkel | Nov. 15, 1949 |
| 2,571,489 | Russell | Oct. 16, 1951 |
| 2,627,714 | Freeman et al. | Feb. 10, 1953 |
| 2,835,100 | McClellan | May 20, 1958 |
| 2,835,101 | Morrison | May 20, 1958 |

FOREIGN PATENTS

| | | |
|---|---|---|
| 155,337 | Australia | Feb. 19, 1954 |